United States Patent
Clement et al.

(10) Patent No.: US 11,865,827 B2
(45) Date of Patent: Jan. 9, 2024

(54) PANEL AND METHOD FOR MANUFACTURING A PANEL

(71) Applicant: FLOORING INDUSTRIES LIMITED, SARL, Bertrange (LU)

(72) Inventors: Benjamin Clement, Waregem (BE); Sam Ledegen, Ghent (BE); José Meirlaen, Deinze (BE)

(73) Assignee: FLOORING INDUSTRIES LIMITED, SARL, Bertrange (LU)

( * ) Notice: Subject to any disclaimer, the term of this patent is extended or adjusted under 35 U.S.C. 154(b) by 87 days.

(21) Appl. No.: 17/593,780

(22) PCT Filed: Mar. 25, 2020

(86) PCT No.: PCT/IB2020/052794
§ 371 (c)(1),
(2) Date: Sep. 24, 2021

(87) PCT Pub. No.: WO2020/194202
PCT Pub. Date: Oct. 1, 2020

(65) Prior Publication Data
US 2022/0161539 A1  May 26, 2022

Related U.S. Application Data

(60) Provisional application No. 62/823,284, filed on Mar. 25, 2019.

(51) Int. Cl.
*B32B 37/24* (2006.01)
*A47B 96/20* (2006.01)
(Continued)

(52) U.S. Cl.
CPC ............ *B32B 37/24* (2013.01); *A47B 96/206* (2013.01); *B32B 3/06* (2013.01); *B32B 5/022* (2013.01);
(Continued)

(58) Field of Classification Search
CPC . E04F 2201/043; E04F 15/107; E04F 13/165; E04F 13/0866; B32B 2607/00;
(Continued)

(56) References Cited

U.S. PATENT DOCUMENTS

| 3,865,683 A | 2/1975 | Schnee et al. |
| 8,956,714 B2 | 2/2015 | Vermeulen |

(Continued)

FOREIGN PATENT DOCUMENTS

| EP | 3384810 A1 * | 10/2018 | ........... A47B 96/206 |
| WO | 9747834 A1 | 12/1997 | |

(Continued)

OTHER PUBLICATIONS

International Search Report and Written Opinion from PCT Application No. PCT/IB2020/052794, dated Jul. 2, 2020.

*Primary Examiner* — Vishal I Patel
(74) *Attorney, Agent, or Firm* — Workman Nydegger (57) ABSTRACT

A panel has a substrate, and a top layer provided thereon. The top layer comprises at least a melamine resin and a binder. The binder is selected from the group comprising: polyacrylates based binder, polyvinyl acetate-based binder, polyester based, acrylic copolymers-based binder or urethane based binder.

15 Claims, 7 Drawing Sheets

(51) Int. Cl.
| | |
|---|---|
| *B32B 3/06* | (2006.01) |
| *B32B 5/02* | (2006.01) |
| *B32B 5/18* | (2006.01) |
| *B32B 27/10* | (2006.01) |
| *B32B 27/12* | (2006.01) |
| *E04F 13/08* | (2006.01) |
| *E04F 13/16* | (2006.01) |
| *E04F 15/02* | (2006.01) |
| *E04F 15/10* | (2006.01) |

(52) U.S. Cl.
CPC ............... *B32B 5/18* (2013.01); *B32B 27/10* (2013.01); *B32B 27/12* (2013.01); *E04F 13/0866* (2013.01); *E04F 13/165* (2013.01); *E04F 15/02188* (2013.01); *E04F 15/107* (2013.01); *B32B 2037/243* (2013.01); *B32B 2255/10* (2013.01); *B32B 2255/26* (2013.01); *B32B 2260/021* (2013.01); *B32B 2260/028* (2013.01); *B32B 2260/046* (2013.01); *B32B 2307/4023* (2013.01); *B32B 2307/412* (2013.01); *B32B 2307/414* (2013.01); *B32B 2307/554* (2013.01); *B32B 2307/726* (2013.01); *B32B 2419/04* (2013.01); *B32B 2607/00* (2013.01); *E04F 2201/023* (2013.01); *E04F 2201/042* (2013.01); *E04F 2201/043* (2013.01)

(58) Field of Classification Search
CPC .......... B32B 2419/04; B32B 2307/726; B32B 2307/554; B32B 2307/414; B32B 2307/412; B32B 2307/4023; B32B 2260/046; B32B 2260/028; B32B 2260/021; B32B 2255/26; B32B 2255/10; B32B 2037/243; B32B 27/12; B32B 27/10; B32B 5/18; B32B 5/022; B32B 3/06; B32B 37/24
See application file for complete search history.

(56) References Cited

U.S. PATENT DOCUMENTS

| | | | |
|---|---|---|---|
| 9,611,659 B2 | 4/2017 | Baert et al. | |
| 2002/0160680 A1 | 10/2002 | Laurence et al. | |
| 2006/0191226 A1* | 8/2006 | Kim .................. | E04F 15/02405 52/781.3 |
| 2008/0118740 A1* | 5/2008 | Kuwahara ............... | B32B 27/06 428/354 |
| 2015/0343739 A1* | 12/2015 | Pervan .................. | E04F 15/107 428/512 |

FOREIGN PATENT DOCUMENTS

| | | |
|---|---|---|
| WO | 2013026559 A2 | 2/2013 |
| WO | 2014065953 A1 | 5/2014 |

* cited by examiner

PANEL AND METHOD FOR MANUFACTURING A PANEL

BACKGROUND

The present invention relates to a panel, for example a floor panel and to a method for manufacturing a panel.

More particularly, the invention relates to a panel with a substrate and a decoration provided thereon. Such panels are widely known as such, for example, in the form of MDF or HDF panels with a printed decoration, such as the laminate panels of WO 97/47834, in the form of vinyl panels, such as in WO 2013/026559, or in the form of so-called WPC (Wood Plastic Composite) panels with a vinyl top layer, such as in WO 2014/065953.

In the case of WO 97/47834 the laminate panel comprises an MDF or HDF board upon which a decorative layer is provided, wherein the decorative layer comprises a printed paper sheet impregnated with melamine resin. Melamine resin provide a rigid and hard surface that gives to the laminate panel wear and abrasion resistance. The laminate panel of WO 97/47834 is manufactured by direct hot pressing the melamine resin upon the laminate board in order to harden the melamine resin via a polycondensation reaction that generates chemical water which can be absorbed by the board. In the case of WO 2013/026559, this relates to water-resistant panels with a substrate of soft or flexible polyvinyl chloride or PVC. Moreover, the decoration and the provided there above finishing layer are made of PVC. If on one hand, the panels of WO'559 are waterproof, on the other hand the surface properties are lower than the those of the panels described WO'834.

U.S. Pat. No. 9,611,659 B2 discloses a panel comprising a waterproof PVC board and a melamine resin adhering each other by means of an intermediate adhesive layer. US'659 further disclose a method for manufacturing said panels that comprise gluing a rigid and cured melamine sheet on top of a PVC board. Although the panels disclosed by U.S. Pat. No. 9,611,659 B2 combine the advantages of the panels disclosed by WO'559 and WO'834, they may be subjected to delamination of the layers if the glue is not sufficiently resistant. Moreover, to securely fasten the melamine resin to the PVC board in high amount of glue is necessary thereby increasing the thickness and the cost of the panel.

U.S. Pat. No. 8,956,714 B2 discloses a waterproof panel and a method for manufacturing a waterproof WPC board wherein a fiberglass or paper layer is provided on top of the melted WPC. In this way it is provided a substrate for hot pressing a melamine resin on top of the WPC board. Therefore US'714 discloses a method for manufacturing special WPC boards for forming waterproof panels having a melamine resin. Moreover, this method requires using fiberglass layers that can increase the cost and thickness of the panel.

SUMMARY

The present invention primarily aims at an alternative panel, wherein, corresponding to the preferred embodiments, a solution is offered to one or more problems with the panels of the state of the art.

To this aim, the invention, according to a first independent aspect thereof, relates to a panel having a substrate, and a top layer with the characteristic that the top layer comprises at least a melamine-based resin and a binder. The binder shall be configured to provide good adhesion between the substrate and the melamine-based resin and to crosslink with the melamine-based resin. A binder differs from a glue in that it improves the adhesion between the substrate and the melamine-based resin since the latter can be hardened directly on the substrate, whereas the glue fasten together two distinct already hardened layers so that the panel is more easily subjected to delamination.

Preferably, the invention also relates to a panel wherein the melamine-based resin of the top layer is hardened directly on the substrate. Wherein "directly on the substrate" means that that the melamine-based is provided onto the substrate and is hardened while it lays onto the substrate, and that it is not hardened separately from the substrate and subsequently fixed to it. Therefore, within the scope of the present invention, "directly on the substrate" doesn't necessarily means that the melamine-based resin is in direct contact with the substrate and it is also irrespective whether between the substrate and the melamine-based resin one or more intermediate layer are provided or not. Hardening the melamine-based resin directly onto the substrate provides for a more flexible process, a reduction of stocks needed and also improves the adhesion between the melamine-based resin and the substrate.

It is to be noted that within the scope of the present application with melamine-based resin is preferably intended a melamine formaldehyde resin. It is also important to be noted that the present invention is preferably related to a panel having a top layer comprising melamine-based resin, although it is not excluded that other resins could be used, in particular resins that cure via a polycondensation reaction.

According to the preferred embodiment of the invention the binder can be chosen within the group comprising: polyacrylate-based, polyvinyl acetate based, acrylic copolymer-based, urethane-based binder and/or polyester-based. It is also possible that the binder comprises a mixture of the above-mentioned substances. According to an embodiment of the invention the binder is a solvent dispersion, preferably a water dispersion, of the abovementioned composition. For example, according to a preferred embodiment the binder is a urethane-based binder, preferably a urethane-based dispersion in water, more preferably an aliphatic or aromatic urethane acrylic copolymer dispersion in water. For example, the urethane-based binder can comprise a cationic or anionic polyurethane. The inventors have found that a urethane-based binder makes possible the adhesion between the substrate and the melamine-based resin so that it is not needed to use a glue and it is also possible to cure the melamine-based resin directly on the substrate. The inventors have found that this composition provides the best results in term of adhesion between the substrate and the melamine-based resin. The urethane-based binder is particularly advantageous in case the substrate is synthetic material based, for example vinyl based, but it provides very good adhesion with any kinds of substrate, for example with cement-based or mineral-based substrate.

According to an embodiment of the invention the binder may comprise a crosslinker to further improve the adhesion between the substrate and the melamine-based resin, for example, the crosslinker may comprise isocyanates, aziridines, carbodiimides.

According to an alternative embodiment of the invention the binder may comprise a coupling agent to improve the adhesion. For example, the coupling agent may comprise silanes.

It is to be noted that using the binder provides also several advantages in term of flexibility of the manufacturing process. In fact, as non-limiting examples, the binder can be provided as coating of the upper surface of previously manufactured substrate, or it can be provided on the substrate during its manufacturing process, or it can be provided as coating of the lower surface of the upper layer, or, for example, it can be provided as a separate layer. Some of the possibilities for providing said binder are described in more detail in the following description.

According to a preferred embodiment of the invention, the top layer may further comprise a water absorbing substance. The inventors have found that the water absorbing substance permits the absorption of the chemical water generated during the curing of the melamine-based resin, so that it is possible to harden or cure the melamine-based resin directly on top of the substrate thereby, at the same time, improving adhesion between the board and the melamine-based resin, as well as speeding up the manufacturing process since it is not needed to cure separately the melamine-based resin and then gluing it on top of the substrate. In general within the context of the present application, water absorbing substance, for example in form of particle or fiber. Examples of water absorbing particles are clays, kaolin, calcium carbonate. Water absorbing fibers can comprise natural fibers, for example, wood, cellulose, flax, cotton, jute or hemp, or fibers made of water absorbing polymers, like starch or super absorbing polymers.

It is noted that within the scope of the present invention, the water absorbing substance can be chosen according to several possibilities, three of which are hereby described as non-exhaustive examples. According to a first possibility, the water absorbing substance may comprise a woody material, like wood particles or wood fibers. Alternatively, according to a second possibility, the water absorbing substance may comprise cellulose fibers. The fibers according to the first and the second possibility may be either random oriented or oriented along a predetermined direction in order to promote the expulsion of water in that predetermined direction during pressing of the melamine resin upon the substrate. According to a third possibility the water absorbing substance may comprise mineral particles, for examples silica particles.

In case the top layer comprises the water absorbing substance, it is preferred that said substance is impregnated with the binder. For example, the water absorbing substance is provided in form of a binder impregnated sheet, for example a wood fiber sheet, a cellulose fiber sheet like a paper sheet. Anyway, it is not excluded that the water absorbent substance is impregnated with a resin material that is different from the binder. According to this embodiment, for example, the water absorbing substance may be provided in form of a sheet laminated to the top surface of the substrate.

Within the meaning of the present invention, with "top layer" it is meant the layer, or plurality of layers, provided above the substrate. Therefore, according to the present invention the expression "top layer" is not limited to the upper final layer of the panel. Moreover, according to the present invention the top layer can comprise one or more layers superimposed each other.

For example, the top layer may comprise at least a decorative layer, an overlay or a wear layer or a combination of said layers.

For example, the top layer may comprise a decor. The décor may be in form of a printed motif or pattern, for example a motif imitating a natural stone, a wood pattern or any drawings or graphic. In case the décor is a printed motif the print may be performed by analog printing, like for example offset printing, or digital printing, preferably inkjet digital printing. It is also not excluded that the décor is in form of a uniform coloration of a surface of a panel. In this case the said uniform coloration may be provided, for example, in form of a print or by mixing a coloring agent to the melamine resin and/or to the binder.

According to the preferred embodiment the décor is provided on a carrier, for example a sheet, preferably a paper sheet or a PVC sheet, to be laminated onto the substrate. In this case the carrier can be impregnated with the melamine-based resin and/or the binder. Alternatively, the décor may be printed directly onto the substrate. Wherein, with "printed directly onto the substrate" is meant that the printing operation is performed directly onto the substrate and not that the print is in direct contact with the top surface of the substrate. Therefore, within the context of the present application "printed directly onto the substrate" doesn't exclude that one or more layers are interposed between the décor and the top surface of the substrate.

The top layer may further comprise an overlay disposed above the décor. Said overlay is preferably translucent or transparent. Moreover, said overlay is configured to act as a wear layer. Preferably the overlay comprises a resin, for example melamine-based resin, and/or the binder. In a preferred embodiment the overlay may comprise a carrier impregnated with the abovementioned resin, for example with the melamine-based resin and/or with the binder. Said carrier is preferably a sheet, for example a paper sheet or a transparent PVC sheet.

The top layer, for example the overlay, may comprise hard particles, for example, of aluminum oxide and/or silica in order to achieve an increased wear resistance.

Preferably, the top layer comprises a thickness below 1 mm, preferably below 0.50 mm, more preferably below 0.25 mm, for example below 0.15 millimeter. The inventors have found that a thinner layer comprising melamine-based resin provides a lower quantity of chemical water generated during curing of the melamine-based resin itself. Therefore, it is preferred that the thickness of the top layer is comprised between 0.11 and 0.13 millimeter to provide a good balance between reducing the generation of water and the surface properties. Therefore, within the context of the present invention, with thickness of the top layer is meant the thickness of the whole top layer, as well as the sum of thicknesses of all the layers of the top layer which comprise the melamine-based resin.

The top layer may comprise also one or more binding layer comprising the binder or a mixture of the binder and of the melamine-based resin and being provided between the substrate and at least one melamine layer of the top layer. Where with the expression "melamine layer of the top layer" is meant any layer of the top layer comprising melamine-based resin, for example said melamine layer can be a decorative layer comprising the décor and/or the overlay. It is also not excluded that the top layer comprises one or more binding layers provided between other layers of the top layer itself, for example between the decorative layer comprising the décor and the overlay. Moreover, the binding layer can comprise also the water absorbing substance. It is to be noted that, in case the binding layer is provided above the décor, the binding layer is preferably transparent or translucent. The binding layer may preferably comprise a thickness below 0.2 mm, more preferably below 0.1 mm, for example approximately 0.05 mm. This thickness values are made possible due to the use of the binder, and they are significantly lower than the thickness of a glue layer which is generally around 0.5 mm.

According to an important embodiment of the invention the binding layer can comprise the décor, for example a printed carrier impregnated with the binder and/or a mixture comprising the binder and the melamine-based resin, so that the binding layer substantially act as the decorative layer. This would provide the possibility of limiting the number of layers forming the top layers of the panel and also simplifying the manufacturing method since it is not necessary to perform multiple steps for providing the binder and the décor, but said steps can be merged together.

According to an embodiment of the invention the top layer can also comprise one or more layer having a mixture of melamine-based resin and of binder. For example, the top layer can comprise a decorative layer comprising a carrier impregnated with said mixture of melamine-based resin and of binder. It is also possible that the top layer comprises an overlay comprising said mixture of melamine-based resin and of binder, moreover, said mixture can further impregnate a carrier like a paper sheet. This would provide the possibility of limiting the number of layers forming the top layers of the panel and also simplifying the manufacturing method since it is not necessary to perform multiple steps for providing the binder and the melamine-based resin, but said steps can be merged together.

It is also possible that the top layer comprises a water absorbing layer comprising the water absorbing substance.

In some embodiments, the top layer can comprise a resin impregnated foil. Said resin impregnated foil is preferably disposed below said decorative layer, more preferably between a first binding layer and the decorative layer. The impregnated foil is in fact an extra layer of the top layer that can absorb heat during hardening of the resin thereby shielding the substrate against heat. In this way the substrate is more stable, and adhesion of the top layer is further improved. It is also possible that a second binding layer is interposed between said resin impregnated foil and said decorative layer. Said resin impregnating the foil can comprise a melamine based, a phenol based, urethane based and/or acrylic-based resin, for example melamine formaldehyde resin or phenol formaldehyde resin, melamine urea formaldehyde resin, acrylic or a mixture thereof. Said impregnated foil preferably comprises a paper foil, for example a Kraft paper foil. It is also preferable that said foil comprises a starting weight of between 50 and 200 g/sqm, more preferably between 100 and 180 g/sqm. It is to be noted that with starting weight is meant the weight of the base foil before it is impregnated with the resin. Said resin impregnated foil comprises a resin content of between 30 and 100% wt of the start weight of the foil. The resin impregnated foil can comprise a weight, after impregnation, of between 250 and 300 g/sqm. It also preferable that the resin impregnated foil comprises a low moisture content in order reduce the amount of chemical water during setting of the resin thereby reducing the risk of delamination and further improving thermal shield effect of the resin impregnated foil. For example, the moisture content of the resin impregnated foil is below 6%, preferably below 4%, more preferably below 3%.

The top layer can also comprise a thermoplastic material layer that can be preferably disposed between the any melamine-based resin layer and the substrate. The thermoplastic material is configured to melt during hardening melamine-based layer and subsequently solidify again during cooling thereby welding the top layer to the substrate. More preferably said thermoplastic material layer can be disposed below the lowest melamine-based resin layer of the top layer. For example, the thermoplastic material layer can be interposed between the decorative layer and the substrate, or between the resin impregnated foil and the substrate. In some embodiments, the thermoplastic material layer can be disposed between the binding layer and any, preferably the lowest, melamine-based resin layer of the top layer. In other embodiment, the thermoplastic material layer can be disposed between the binding layer and the substrate. The thermoplastic material layer is preferably in form of a nonwoven sheet comprising fibers of thermoplastic material, or in form of an extruded sheet. Within the context of the present application, said thermoplastic material can preferably any material having a melting temperature between 70 and 160° C., preferably between 80 and 140° C., for example between 80 and 130° C. Said thermoplastic material can comprise polyolefin, polypropylene, polyester, polyvinylbutyral, bicomponent polyester or a mixture thereof.

Said thermoplastic material layer can further comprise a water absorbing substance, for example in form of particle or fiber. Examples of water absorbing particles are clays, kaolin, calcium carbonate. Water absorbing fibers can comprise natural fibers, for example, wood, cellulose, flax, cotton, jute or hemp, or fibers made of water absorbing polymers, like starch or super absorbing polymers.

According to an embodiment of the invention, the top layer may further comprise a relief structure, for example representing wood nerves or grains, or stone grain and flakes. Preferably, the relief structure is in register with the décor. Moreover, said relief structure may be preferably provided in the melamine-based resin. In particular, the relief structure may be embossed in the melamine-based resin during hardening of the melamine-based resin itself. It is to be noted that embossing the relief structure on the melamine-based resin during hardening of the melamine directly onto the substrate provides the possibility of embossing in register with the décor. Said relief structure may further provide other features to the panel, preferably aesthetic feature like, for example beveled edges. The relief structure is preferably provided in the overlay. It is to be noted that thanks to the presence of the binder that improves the adhesion between the melamine-based resin and the substrate it is possible to have a deep embossing of the relief structure without the need of high pressures in the embossing step. In fact, without the use of the binder it could be necessary to use higher pressures during embossing that could damage the substrate.

The top layer, and in particular any layer comprising the melamine-based resin, may further comprise fillers or additives in order to reduce the quantity of chemical water generated during curing of the melamine-based resin without compromise the properties of the melamine-based resin itself. Examples of such fillers could be glycerol sorbitol, polysaccharides, monosaccharides, diethylene glycol, PVA or superabsorbent polymers (SAP).

It is not excluded that the top layer may comprise one or more further layers like for example a primer coat layer and/or a base coat layer and/or a lacquer above the overlay. The lacquer may be, for example, UV or electron beam cured.

With the aim of the present invention the substrate may comprise any material suitable to be used as board in furniture, wall covering or floor panel. It is also preferable that the substrate is waterproof, wherein with waterproof is meant that the material substrate doesn't degrade and/or swell or inflate in presence of water, for example (but not necessarily) it doesn't absorb water or it is substantially impermeable, for example the substrate can be water-repellant, for example hydrophobic. For example, the substrate can comprise, preferably can be substantially made by, a synthetic material, preferably polymeric material, a cement-based material, or a mineral-based material.

In case of cement-based board, the cement may be Portland cement. In case of cement-based material the substrate may comprise a fiber containing cement board. With fiber containing cement board is intended a board containing at least a cement and a fibrous material, bonded together, for example pressed together to form the board. The fibers can be for example polymeric fibers or natural fibers. The adhesion is preferably carried out under pressure either in a cold or warm condition.

In case of mineral based material, the substrate may comprise a fiber containing mineral board. With fiber containing mineral board is intended a board containing at least a mineral and a fibrous material, bonded together, for example pressed together to form the board. The mineral can comprise silica, calcium carbonate or gypsum and/or magnesium oxide or any mixture or compound of said minerals. The fibers can be for example polymeric fibers or natural fibers. The adhesion is preferably carried out under pressure either in a cold or warm condition.

In case the substrate is made of a cement-based material or of a mineral based material, the substrate can be a multilayered board, for example comprises a plurality of layers overlapped and fixed each other. Each of said layer can be made of a cement-based material or of said mineral-based material and can comprises said fibers. Moreover, in some embodiments, said layers can show different composition and/or features each other, said different features can be for example different chemical composition and/or chemical properties, and/or mechanical and/or physical properties. For example, layers of a same substrate can be made of cement-based or mineral-based material having different composition. In other embodiment, said layers of the same substrate can comprise different kind of fibers, or different quantity of fibers, for example some layers can be free of said fibers.

Preferred examples of synthetic materials, or polymeric material, are vinyl based material or phenolic based material.

In case of vinyl-based material, the substrate can comprise a PVC-based board like the so called LVT (flexible LVT, rigid LVT, layered LVT or single core LVT), WPC or SPC board. It is noted that PVC shows goods adhering behavior to the urethane-based binder.

According to said preferred embodiment wherein the substrate comprises a PVC-based board, the substrate may comprise a foamed layer, a layer is intended which comprises hollow spaces, preferably in such an amount that the density of the material is reduced by at least 10% and preferably at least 25%. Preferably, this relates to so-called "closed cell" foam. By non-foamed layer a layer is meant without hollow spaces, or anyhow at most with an amount of hollow spaces such that the density is not or not more than 10% reduced, and preferably even not more than 2%.

In some embodiments, the PVC board relates to so-called rigid PVC, namely PVC which is free from plasticizers or contains a content of plasticizers of 12 phr or less. Preferably, the content of plasticizers is between 1 and 6 phr. The stiffness of a layer of such hard foam is comparable to that of a non-foamed layer; however, due to its lower weight it offers ergonomic advantages during installation.

Preferably, the PVC board relates to a non-foamed rigid PVC. For example, said non foamed rigid PVC show high density and/or high melting point. For example, the non-foamed rigid PVC board may have a density above 1.6 g/cm$^3$, more preferably above 1.9 g/cm$^3$. Said non-foamed PVC board can comprise one or more filler, preferably mineral filler like chalk, talc, calcium carbonate, silica and other minerals. In some preferred embodiment said filler can be more than the 30% wt of the substrate, preferably more than 50% wt, for example 60% wt or more of the total weight of the substrate. In this case the PVC board can be a so called SPC board (Solid Polymer Composite).

It is evident that the invention is not limited to foamed layers of PVC, but is also applied in panels where the foamed layer is formed of another thermoplastic material, such as a phenol foam, polyurethane foam, polypropylene foam, polyethylene foam or polyethylene terephthalate foam.

In case of phenolic based material, the substrate can comprise a plurality of phenolic impregnated carrier pressed and cured onto each other, said carrier can be sheets, preferably paper sheets.

For example, the substrate may be realized as a panel substantially made of a core material on the basis of carrier sheets, preferably paper, impregnated with a resin, preferably at least melamineformaldehyde and/or at least phenol-formaldehyde resin and/or ureumformaldehyde resin.

It is to be noted that the substrate may further comprise one or more reinforcement layers, for example a glass fiber layer, such as a woven or non-woven glass fiber layer. Moreover, it shall also be noted that the substrate may further comprise at least a not yet foamed layer of a thermoplastic material, preferably a plurality of said non-foamed layers. Preferably, the aforementioned non-foamed layer contains the same thermoplastic material as the aforementioned foamed layer or is based on the same thermoplastic material.

Preferably, the substrate of the panel of the invention has a thickness from 3 to 8 millimeters. The panels of the invention preferably are made in the form of rectangular oblong strips. The dimensions thereof may vary greatly. Preferably the panels may have a length exceeding 1 meter, and a width exceeding 0.1 meter, e.g. the panels can be about 1.3 meter long and about 0.15 meter wide. According to an embodiment the length of the panels exceeds 2 meter, with the width being preferably about 0.2 meter or more.

The panel of the invention can preferably be applied for realizing a wall or floating floor covering. To this aim, they may be provided with coupling means on one or more edges.

Preferably, the panel of the invention shows the characteristic that, on at least two opposite edges, it is provided with coupling means which allow coupling two such panels together, wherein at the respective edges a locking is effected at least in an horizontal direction parallel to the plane of the panels and/or a vertical direction perpendicular to the plane of the panels. The coupling means may be in the form of a tongue and groove, or alternatively they may be in form of hook shaped elements. it is also possible that the panel comprises a first kind of coupling means on a first couple of edges, for example tongue and groove on the long edges, and a second kind of coupling means on a second couple of edges, for example hook shaped elements on the short edges.

It is also noted that the panel according to the invention may be a furniture panel, a wall covering or a floor panel. It is also possible that the panel of the invention comprises two top layers according to the invention and being provided on opposite surfaces of the substrate. This is particularly the case for furniture panels.

It is noted that the characteristic that the top layer comprises a water absorbent substance, forms an inventive idea irrespective of the presence of the binder. Hence, according to a second independent aspect, the invention may relate to a panel comprising a substrate and a top layer comprising a melamine-based resin, with the characteristic that the top layer further comprises a water-absorbing substance. The water absorbing substrate allows the direct pressing of the melamine-based resin on top of the substrate thereby improving adhesion of the melamine-based resin to the substrate while at the same time speeding up the manufacturing process of the panel.

It is to be noted that the panel according to this second independent aspect may comprise any of the features described in relation to the first independent aspect.

It is noted that the characteristic that the top layer comprises a resin impregnated foil disposed between the melamine-based resin and the substrate to provide a thermal shield for the substrate, forms an inventive idea irrespective of the presence of the binder. Hence, according to a third independent aspect, the invention may relate to a panel comprising a substrate and a top layer comprising a melamine-based resin, with the characteristic that the top layer further comprises a resin impregnated foil provided between the melamine-based resin and the substrate. The most preferred embodiment of this third aspect provide for top layer having a decorative layer, preferably provided in form of a printed sheet, and the resin impregnated foil is provided between the decorative layer and the substrate.

It is to be noted that the panel according to this third independent aspect may comprise any of the features described in relation to the first independent aspect.

It is also to be noted that the characteristic that the top layer comprises a thermoplastic material layer disposed between the melamine-based resin and the substrate to provide welding effect and improve adhesion between the top layer and the substrate, forms an inventive idea irrespective from the presence of the binder, of the impregnated foil and of the water absorbing substance. Hence, according to a fourth independent aspect, the invention may relate to a panel comprising a substrate and a top layer comprising a melamine-based resin, with the characteristic that the top layer further comprises thermoplastic material layer provided between the melamine-based resin and the substrate.

It is to be noted that the panel according to this fourth independent aspect may comprise any of the features described in relation to the first independent aspect.

With the same aim as in the first aspect, the invention, according to a fifth independent aspect thereof, relates to a method for manufacturing a panel, with the characteristic that the method comprises the following steps: the step of providing a substrate; the step of providing a top layer comprising a melamine-based resin on top of the substrate; and the step of curing the melamine-based resin directly on top of the substrate. It is to be noted that the panel according to this third independent aspect may comprise any of the features described in relation to the first and or the third independent aspect. Wherein "directly on the substrate" means that that the melamine-based is provided onto the substrate and is hardened while it lays onto the substrate, and that it is not hardened separately from the substrate and subsequently fixed to it. Therefore, within the scope of the present invention, "directly on the substrate" doesn't necessarily means that the melamine-based resin is in direct contact with the substrate and it is also irrespective whether between the substrate and the melamine-based resin one or more intermediate layer are provided or not. Curing, or hardening, the melamine-based resin directly onto the substrate provides for a more flexible process, a reduction of stocks needed and also improves the adhesion between the melamine-based resin and the substrate. Moreover, curing the melamine-based resin directly on the substrate provides the possibility of creating structures and reliefs on the melamine-based surface. This also provides for creating structures in register with the print and/or comprising other features like for example beveled edges.

According to the preferred embodiment of the invention, said step of curing the melamine-based resin is performed by hot pressing the melamine-based resin itself. Preferably, the method of the invention shows the characteristic that the step of hot pressing the melamine-based resin is performed at a pressure comprised between 20 kg/cm$^2$ and 80 kg/cm$^2$, preferably between 35 kg/cm$^2$ and 60 kg/cm$^2$. Moreover, the step of hot pressing is performed at a temperature comprised between 140° C. and 220° C., preferably between 175° C. and 195° C. It is also preferable that the step of hot pressing is performed for a pressing comprised between 10 and 60 seconds, preferably between 12 and 22 seconds.

In particular, according to a preferred embodiment of the invention the curing step is performed with a temperature above 175° C. and for a pressing time below 35 seconds. This avoids the excessive increase of the substrate temperature that can result in a risk of delamination of the top layer. It is to be noted that in case the top layer comprises a resin impregnated sheet, said impregnated sheet can shield the substrate against heat thereby reducing risk of delamination and viscosity decrease of the substrate material, so that pressing can be performed at higher temperature.

According to an alternative preferred embodiment of the invention the curing step is performed with a temperature below 195° C. and for a pressing time above 10 seconds. This provides for a lower steam pressure between the top layer and the substrate to reduce the risk of delamination.

For example, the curing step can be performed with a temperature below 170° C., preferably below 150° C., for example at 140° C. and for a pressing time between 70 and 150 seconds. In this way, especially when the substrate is made of a thermoplastic material, it is possible to avoid excessive viscosity decrease of the material forming the board and thus reducing the risk of dimensional stability during handling.

Preferably, the method of the invention shows the characteristic that it comprises the step of providing a top layer having a binder. In the method according to the invention several possibilities of providing the binder are available, some of which are listed here below as exemplary and non-exhaustive embodiments.

According to a first possibility, said step of providing the binder comprises coating the upper surface of the substrate with the binder. To this aim any coating technique is suitable like, for example, spraying or rolling. It is also not excluded that the binder is provided via a plurality of subsequent coating application on the substrate. For example, the binder may provided in liquid form on the top surface of the substrate during a first coating application, then a sheet material, like the printed paper sheet or a water absorbing substance sheet or the resin impregnated sheet or the nonwoven sheet is provided on the binder, then binder may be provided in liquid form on the sheet material during a second coating application.

According to a second possibility, said step of providing the binder comprises coating the at least lower surface of a carrier, for example of a resin impregnated sheet, preferably a paper sheet, for example impregnated with the melamine-based resing. the carrier can be for example a printed paper provided with the décor, thereby determining the decorative layer, or a paper layer forming the overlay, or a paper layer forming the resin impregnated sheet or the nonwoven thermoplastic foil. In this case, at least one face of the carrier can be coated with the binder. It is also possible that the carrier is coated on one side with the binder and on the other side with the melamine-based resin. It is also not excluded that the carrier, instead of being impregnated, is coated with the binder and or with the mixture of binder and melamine-based resin at least on one of its main surfaces, for example the carrier can be coated on one surface with the binder and on the opposite surface with a mixture of binder melamine-based resin.

According to a third possibility, said step of providing the binder comprises laminating a binder impregnated carrier onto the top surface of the substrate. According to this third possibility the carrier, can be substantially fully impregnated with the binder or can impregnated with a mixture of binder and melamine-based resin. According to said third possibility, the carrier can comprise a sheet of water absorbing substance, for example a sheet of silica particles pressed together, a cellulose fiber sheet, a paper sheet or a wood fiber sheet. It is also possible that the carrier is a decorative sheet, for example a printed sheet, preferably of paper or PVC. It is also possible that the carrier is an overlay sheet of paper that covers the décor.

It is also not excluded that the binder is provided according to a fourth application that is substantially a combination of one or more of the first second and third application.

The method may also comprise the step of providing a top layer comprising the water absorbing substance, for example by spreading the water absorbent substrate above the top surface of the substrate. It is also possible that the water absorbing substance is provided in form of a sheet to be laminated onto the substrate.

In the preferred embodiment wherein the binder, is provided in solvent dispersion, it is advantageous to remove most of, preferably all of, the solvent, for example water, contained into the dispersion before hardening the melamine-based resin. Therefore, according to a preferred embodiment of the invention, the method may comprise the step of drying the top layer comprising the binder, or any part of the top layer comprising the binder. Said step of drying may preferably take place immediately after the step of providing the binder, but, in any case, before the step of curing the melamine-based resin. For example, the step of drying may be carried out via hot-air blowing, IR (Infrared) radiation or NIR (Near Infrared) radiation or a combination of one or more of these techniques. In case the binder is provided in multiple application steps, for example in multiple coating applications, the drying step may preferably be performed after each application steps, although it is not excluded that the method comprises one drying step after all the application steps.

According to the preferred embodiment of the invention, the method of the invention shows the characteristic that the step of providing the melamine-based resin may comprise the step of laminating at least one carrier impregnated with melamine-based resin, preferably a sheet, for example a paper sheet. In this case the carrier can be a printed paper sheet forming the decorative layer, and/or an overlay paper sheet to be provided above the décor. It is also not excluded that the carrier, instead of being impregnated, is coated with the melamine-based resin at least on one of its main surfaces.

According to this preferred embodiment, the melamine-based resin impregnating the carrier, may be provided in a B-stage condition, i.e. a condition wherein the melamine-based resin is partially hardened. For example, said melamine-based resin impregnated carrier may be provided in a B-stage condition wherein the portion of the hardened resin is above 60% wt of the total mass of the resin in the impregnated carrier preferably above 75% wt. This is particularly advantageous since it permits to reduce the amount the of melamine-based resin to be cured and therefore of the chemical water to be generated but at the same time some resin to be hardened still left so that the direct curing provides good adhesion between the substrate and the top layer.

According to an alternative embodiment, said step of providing the melamine-based resin may comprise the step of coating the substrate, with the melamine-based resin. In accordance with this alternative embodiment the resin may be provided both in liquid or dry form. This embodiment is particularly desirable for applying an overlay above the décor, and to reduce the quantity of melamine-based resin to be cured.

Preferably, the method of the fifth aspect further comprises the step of providing a décor on said substrate. Such décor may be provided in form of a printed carrier, for example a printed sheet. As already described above the printed carrier can be impregnated with the melamine-based resin and/or the binder or with a mixture thereof. Anyway, it is not necessary that said printed carrier is impregnated.

Alternative embodiments of the invention may comprise the step of providing the décor directly on the top surface of the substrate, preferably via digital inkjet printing. Wherein "directly on the substrate" means that that the printing operation is performed onto the substrate, and not that the printing operation is performed on a separate carrier, like a paper sheet, that subsequently attached on the substrate. Therefore, within the scope of the present invention, "directly on the substrate" doesn't necessarily mean that the print is in direct contact with the surface of the substrate and it is also irrespective whether between the substrate and the print one or more layer are provided or not, on the contrary in this case it could be preferable to provide a primer coating on the surface of the substrate before providing the print or, in any case perform a step of treating the top surface of the substrate in order to prepare it for direct printing.

It is also possible that the décor is provided by dispersing a coloring agent in the melamine-based resin and/or in the binder.

It is to be noted that the method can comprise the step of providing the resin impregnated foil on the substrate, said step being preferably a calendaring or a lamination step. Said step of providing said resin impregnated foil is preferably anticipated by the step of drying the resin impregnated foil in such a way to bring the moisture content of the foil to a value below 6%, preferably below 4%, more preferably below 3%.

It is to be noted that the method can comprise the step of providing the thermoplastic material layer on the substrate, said step being preferably a calendaring or a lamination step.

In some embodiment of the invention, the method may comprise a step of providing the edges of said panels with coupling means. Said step is preferably a machining step, for example a milling step. Moreover, said step of providing the coupling means is preferably performed after the step of curing.

It is to be noted that the method of the fifth aspect, in any of its embodiments may be directed to manufacturing a board having dimensions larger than those of the panel, and that after the step of curing the melamine-based resin, the method comprises the step of cutting said board to obtain a plurality of panels. Said step of cutting may be performed before said step of providing the panel with the coupling means.

It is clear that the method of the fifth aspect can be excellently used for manufacturing the panels of the first, second, third and fourth aspect and the preferred embodiments thereof.

Moreover, it is to be noted that according to a sixth independent aspect, the invention relates to a method for manufacturing a panel comprising the following steps: the step of providing a substrate; the step of providing a top layer on top of the substrate, wherein said top layer comprises a melamine-based resin, wherein the top layer comprises a decorative layer, and wherein the top layer further comprises a resin impregnated foil to be disposed between the decorative layer and the substrate; and the step of curing the melamine-based resin directly on top of the substrate.

Further, it is to be noted that according to a seventh independent aspect, the invention relates to a method for manufacturing a panel comprising the following steps: the step of providing a substrate; the step of providing a top layer on top of the substrate, wherein said top layer comprises a melamine-based resin, wherein the top layer comprises a decorative layer, and wherein the top layer further comprises thermoplastic material layer disposed between the decorative layer and the substrate; and the step of curing the melamine-based resin directly on top of the substrate.

Any of the method according to the sixth or seventh aspect can comprise any of the features of the method of according to the fifth aspect.

BRIEF DESCRIPTION OF THE DRAWINGS

With the intention of better showing the characteristics of the invention, herein below, as an example without any limitative character, some preferred embodiments are described, with reference to the accompanying drawings, wherein.

DETAILED DESCRIPTION OF VARIOUS EMBODIMENTS

Figure 1:
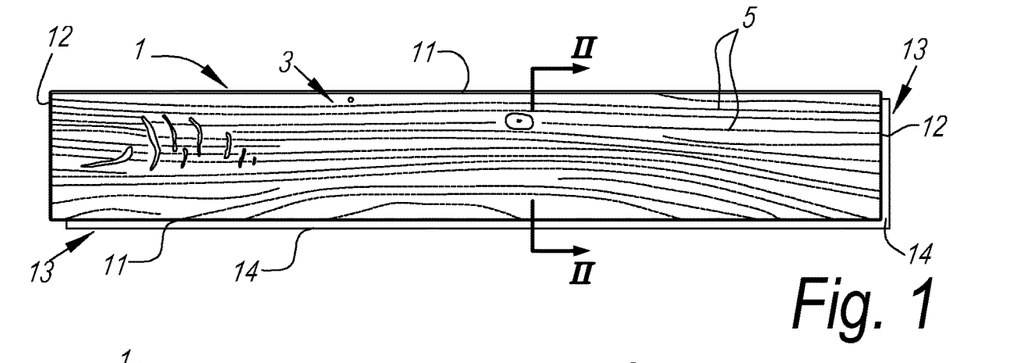
FIG. 1 represents an upper view of a panel having the characteristics of the invention.

FIG. 1 represents a rectangular floor panel 1.

Figure 2:
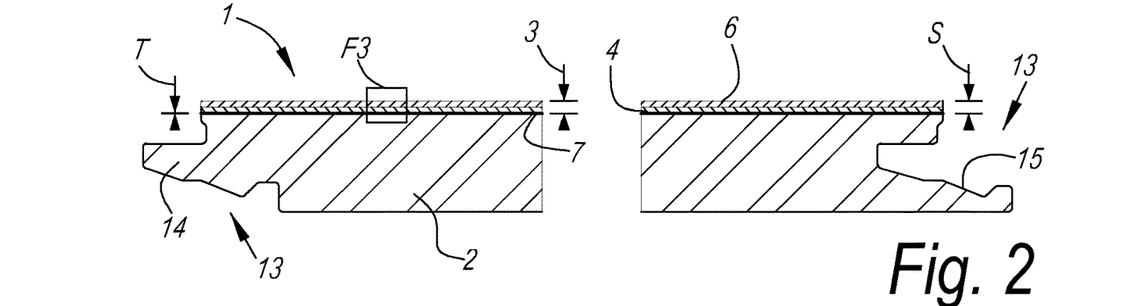
FIG. 2, at a larger scale, represents a cross-section according to the line II-II indicated in FIG. 1, according to a first embodiment.

FIG. 2 clearly shows that the floor panel 1 comprises a substrate 2 and a top layer 3 provided thereon.

The substrate 2 is preferably waterproof and can comprise a synthetic material, for example vinyl based or phenolic based, a cement based material or a mineral based material. In the illustrated example, the substrate is vinyl based and comprises a PVC board, for example stiff foamed PVC. Examples of PVC boards are LVT, WPC or SPC boards.

In the illustrated example, the top layer 3 comprises a decorative layer 4 having a décor 5 that comprises a printed motif representing a single wooden plank (as visible from FIG. 1). In the preferred embodiment, as it will be explained further on, the decorative layer 3 comprises melamine-based resin.

In the illustrated examples, the top layer 3 further comprises an overlay 6 provided on top of the decorative layer 3 that is configured to protect the decorative layer 3 itself and that is configured to act as a wear layer. It is noted that the overlay 6 is preferably transparent or translucent. In the preferred embodiment, as it will be explained further on, the overlay 6 comprises melamine-based resin.

As visible in FIG. 2 the layers comprising melamine resins, i.e. the decorative layer 3 and the overlay 6 shows a global thickness S, defined as the sum of the two thicknesses, below, 0.5 mm, preferably, below 0.25 mm, more preferable below 0.15 millimeter. Preferably, the thickness S of the layers comprising melamine resins is comprised between 0.11 and 0.13 millimeter.

The top layer 3 further comprises a binding layer 7 disposed between the decorative layer 3 and the substrate 2. The binding layer comprises a binder. The binder may be selected from the group comprising: polyacrylates based, polyvinyl acetate based, acrylic copolymer based, polyester based or urethane-based binder. For example, the binder is preferably a urethane-based binder, in particular, a urethane acrylic copolymer dispersion in water.

In the example shown in FIG. 2 the binding layer 7 shows a thickness T below 0.2 mm, preferably below 0.1 mm, for example approximately 0.05 mm.

The panel 1 from the example is, at least on the two opposite long edges 11, preferably on all the edges 11,12, provided with coupling means 13 allowing to couple two of such panels 1 to each other, wherein a locking is effected at the respective long and short edges 11,12 in a vertical direction perpendicular to the plane of the panels 1, as well as in a horizontal direction perpendicular to the respective edges and in the plane of the panels 1. In the example, the coupling means 135 are in the form of a tongue 14 and a groove 15.

Figure 3:
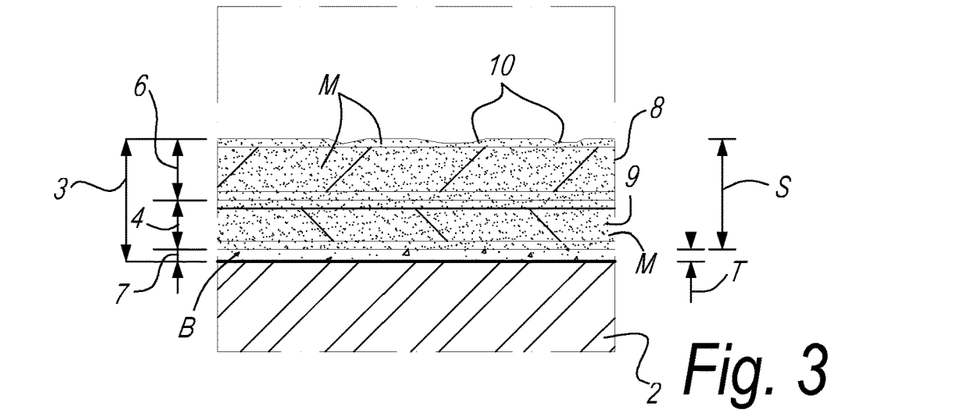
FIG. 3 on a larger scale shows a view on the area F3 indicated on FIG. 2.

FIG. 3 shows, on a larger scale, the detail F3 of FIG. 2. According to the embodiment shown in FIG. 3 the overlay 6 comprises a carrier, preferably a paper sheet 8, impregnated with the melamine-based resin M. Preferably the overlay 6 comprises wear resistant particles (not shown).

Similarly, according to the embodiment shown in FIG. 3 the decorative layer 4 comprises a printed paper sheet 9 provided with the décor 5 that is impregnated with the melamine-based resin M.

The binding layer 7, in the embodiment of FIG. 3, is disposed below the decorative layer 4 and the substrate 2, is free from any carrier in order to reduce the thickness T of the binding layer itself.

FIG. 3 also shows that the floor panel 1 comprises a relief structure 10 provided in the top layer 3, preferably in the overlay 6. According to the preferred embodiment, the relief structure 10 is in register with the décor 5.

Figure 4:
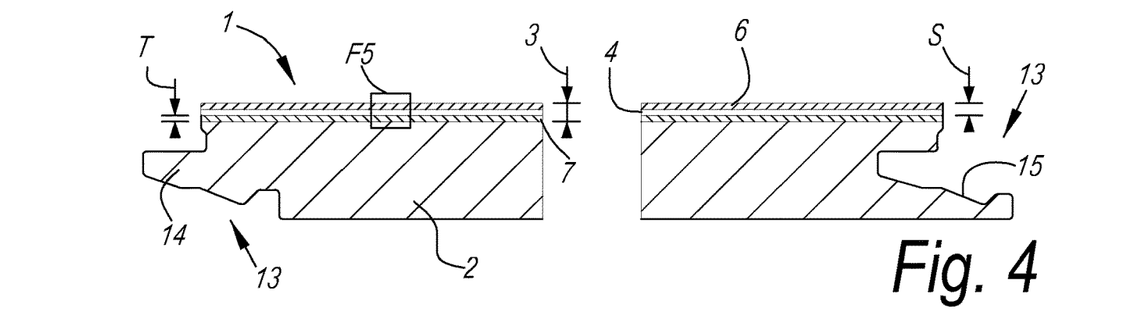
FIG. 4 at a larger scale, represents a cross-section, according to the line II-II indicated in FIG. 1, according to a second embodiment of the invention.
Figure 5:
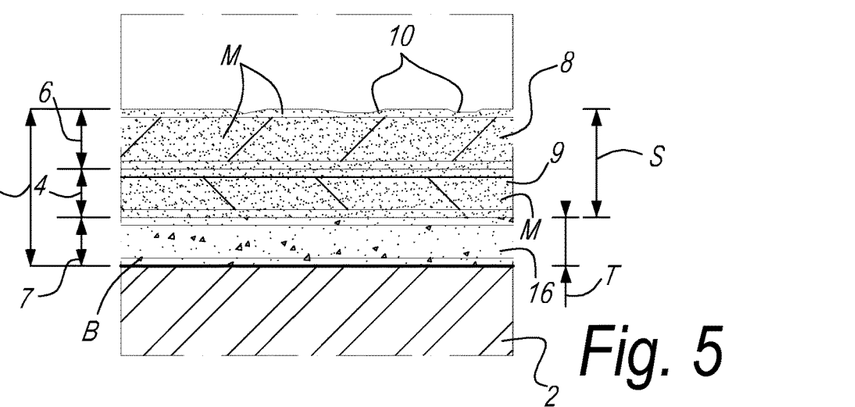
FIG. 5 on a larger scale shows a view on the area F5 indicated on FIG. 4.

FIGS. 4 and 5 show an alternative embodiment of the floor panel 1 that differs from the embodiment shown in FIGS. 2 and 3 wherein the binding layer 7 comprises a water absorbent substance 16. In this example, the water absorbing substance 16 is a paper sheet 17 impregnated with the binder B. According to alternative embodiments, the water absorbing substance 16 can comprise wood fibers, cellulose fibers, or mineral particles like silica particles.

Figure 6:
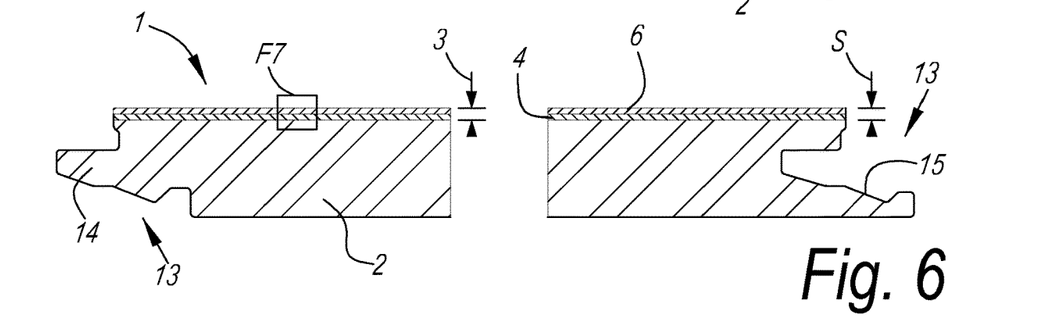
FIG. 6 at a larger scale, represents a cross-section, according to the line II-II indicated in FIG. 1, according to a third embodiment of the invention.
Figure 7:
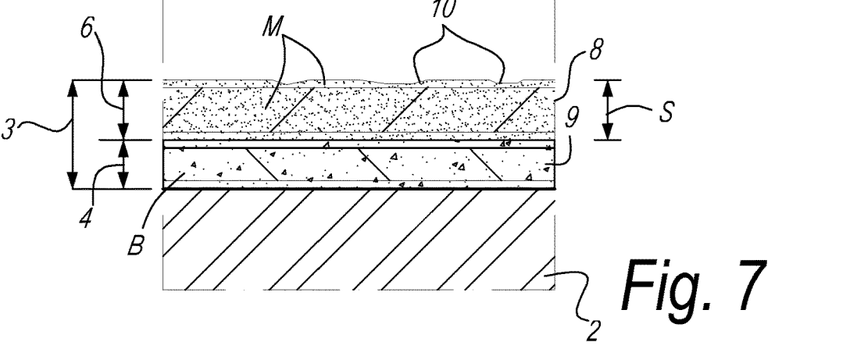
FIG. 7 on a larger scale shows a view on the area F7 indicated on FIG. 6.

FIGS. 6 and 7 shows one further embodiment that differs from the embodiment shown in FIGS. 2 and 3 in that the decorative layer 4 comprises a printed paper sheet 9 impregnated with the binder B. Therefore, the decorative layer 4 according to this embodiment is configured to act as the binding layer 8.

Figure 8:
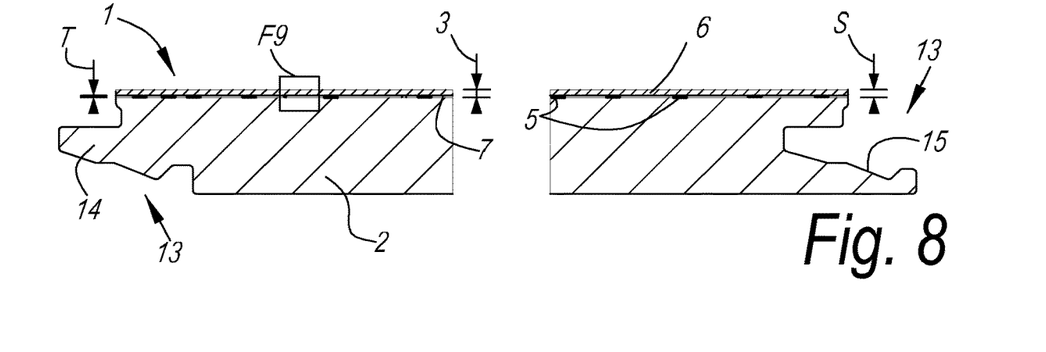
FIG. 8 at a larger scale, represents a cross-section, according to the line II-II indicated in FIG. 1, according to a fourth embodiment of the invention.
Figure 9:
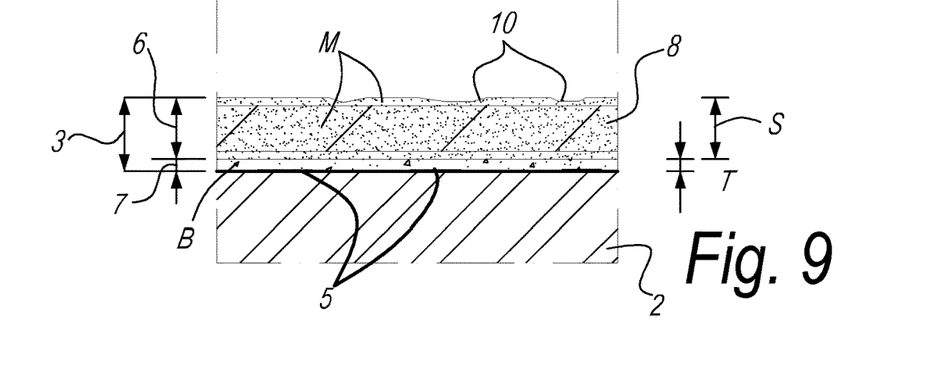
FIG. 9 on a larger scale shows a view on the area F9 indicated on FIG. 8.

FIGS. 8 and 9 shows one further embodiment that differs from the embodiment shown in FIGS. 2 and 3 in that the décor 5 is printed directly onto the top surface of the substrate 2, for example by digital printing. The top layer 3 comprises transparent or translucent binding layer 8 comprising the binder B disposed above the décor 5 and below the overlay 6 comprising the melamine-based resin M impregnating a paper sheet 8. Alternatively, the overlay 6 could comprise a paper sheet 8 impregnated with a mixture comprising the binder B and the melamine-based resin M.

Figure 10:
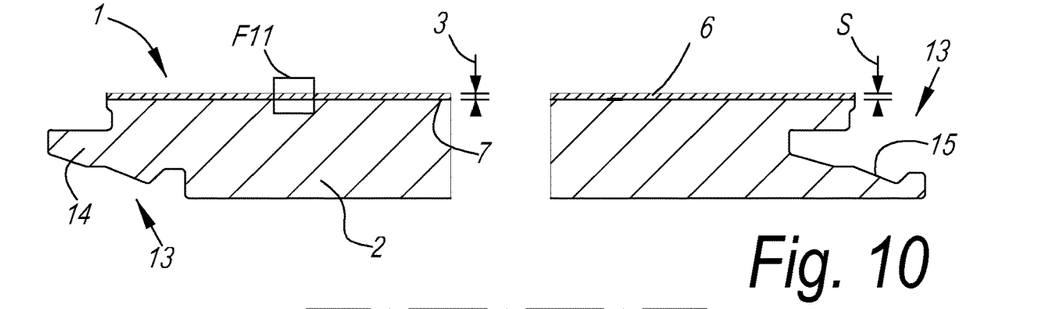
FIG. 10 at a larger scale, represents a cross-section, according to the line II-II indicated in FIG. 1, according to a fifth embodiment of the invention.
Figure 11:
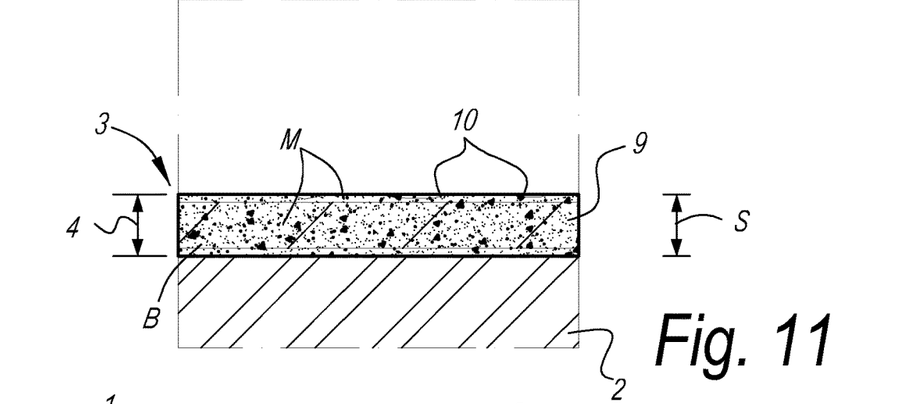
FIG. 11 on a larger scale shows a view on the area F11 indicated on FIG. 10.

FIGS. 10 and 11 shows one further embodiment that differs from the embodiment shown in FIGS. 2 and 3 in that the top layer 3 comprises a decorative layer 4 having a printed paper sheet 9 impregnated with a mixture comprising the binder B and the melamine-based resin M.

Figure 12:
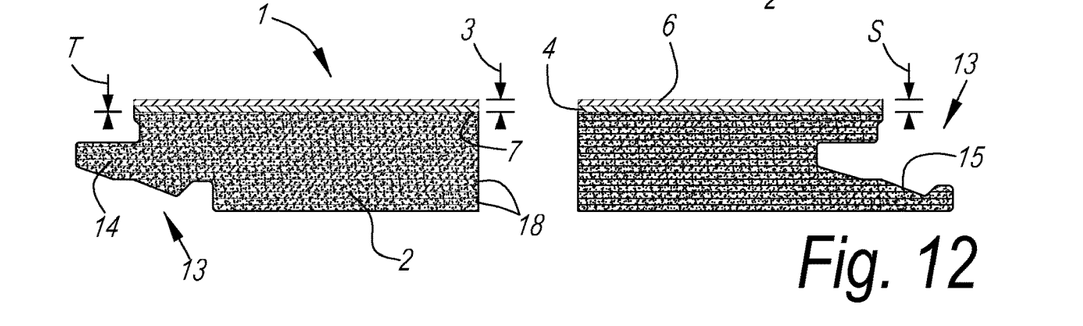
FIG. 12 at a larger scale, represents a cross-section, according to the line II-II indicated in FIG. 1, according to a sixth embodiment of the invention.

FIG. 12 shows an alternative embodiment of the floor panel 1 of FIG. 2 wherein the substrate 2 is made of a phenolic based material. In particular, the substrate 2 comprises a plurality of phenolic impregnated sheets 18, for example paper sheets, pressed and cured onto each other.

Figure 18:
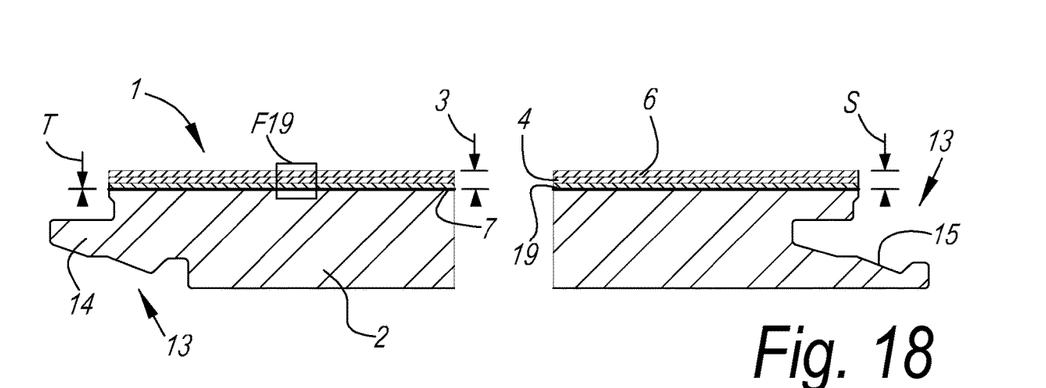
FIG. 18 at a larger scale, represents a cross-section, according to the line II-II indicated in FIG. 1, according to a seventh embodiment of the invention.
Figure 19:
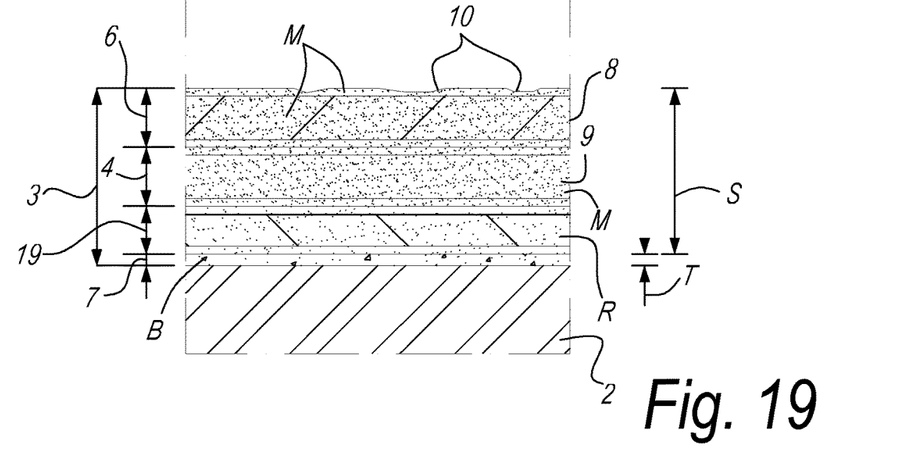
FIG. 19 on a larger scale shows a view on the area F19 indicated on FIG. 18.

FIGS. 18 and 19 shows one further embodiment that differs from the embodiment shown in FIGS. 2 and 3 in that the top layer 3 comprises a resin impregnated foil 19 disposed below the printed paper sheet 9 and above the binding layer 7. The resin impregnated foil 19 comprises a Kraft paper foil impregnated with melamine based, a phenol based, urethane based and/or acrylic-based resin R or a mixture thereof. The Kraft paper foil has a starting weight of between 50 and 200 g/sqm, more preferably between 100 and 180 g/sqm and is impregnated with a resin R content of between 30 and 100% wt of the start weight of the foil. The resin impregnated foil 19 comprises a weight, after impregnation, of between 250 and 300 g/sqm. For example, the moisture content of the resin impregnated foil 19 is below 6%, preferably below 4%, more preferably below 3%.

Figure 20:
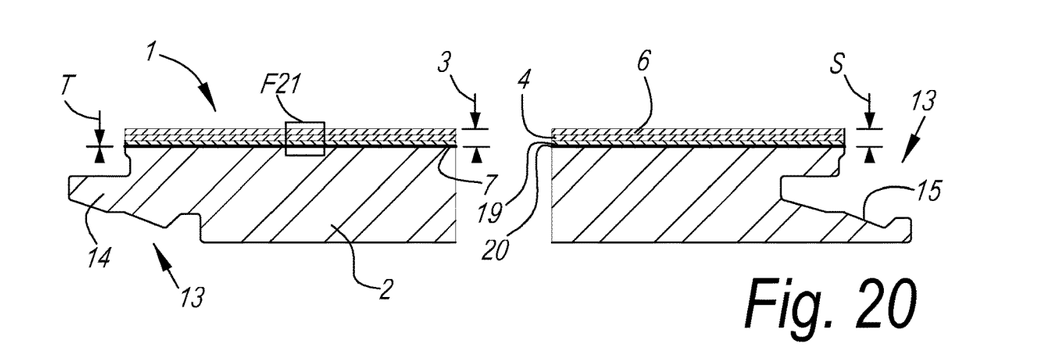
FIG. 20 at a larger scale, represents a cross-section, according to the line II-II indicated in FIG. 1, according to an eight embodiment of the invention.
Figure 21:
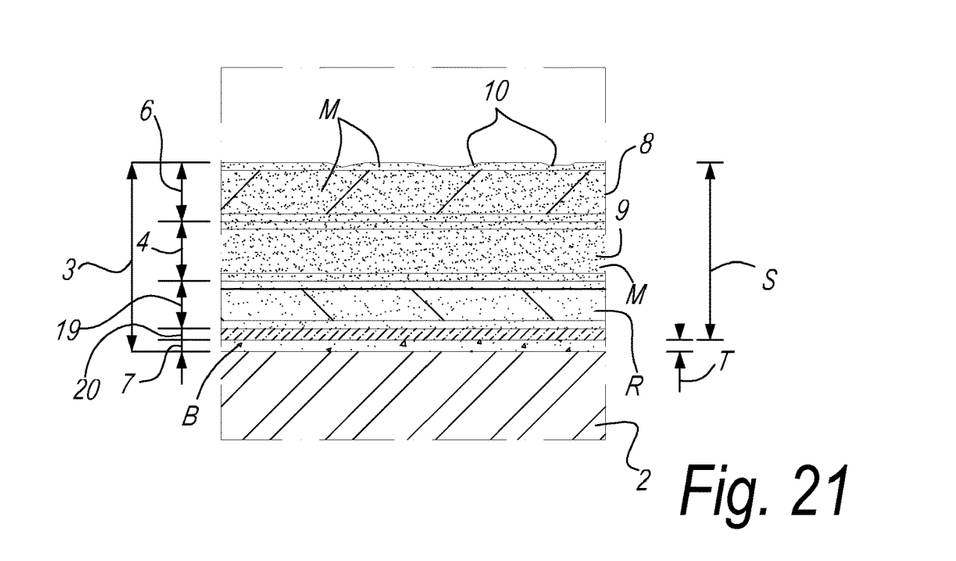
FIG. 21 on a larger scale shows a view on the area F20 indicated on FIG. 20.

FIGS. 20 and 21 shows one further embodiment that differs from the embodiment shown in FIGS. 18 and 19 in that the top layer 3 comprises a thermoplastic material layer 20 disposed between the resin impregnated foil 19 and the substrate 2. In the example, the thermoplastic material layer 20 is disposed between the binding layer 7 and the resin impregnated foil 19. Anyway, in an alternative, not shown, embodiment, the thermoplastic material layer 20 can be disposed between the substrate 2 and the binding layer 7. The thermoplastic material layer 20 is a nonwoven sheet of thermoplastic fibers, preferably polyolefin, polypropylene, polyester and/or bicomponent polyester. The thermoplastic material layer 20 preferably comprises the water absorbing substance 16.

Figure 22:
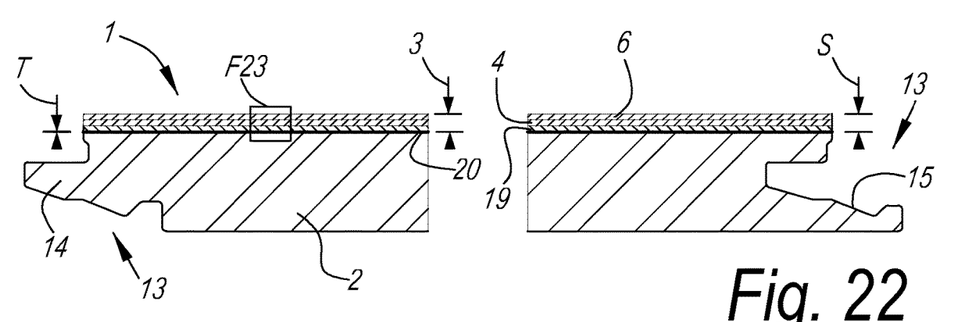
FIG. 22 at a larger scale, represents a cross-section, according to the line II-II indicated in FIG. 1, according to another independent aspect of the invention.
Figure 23:
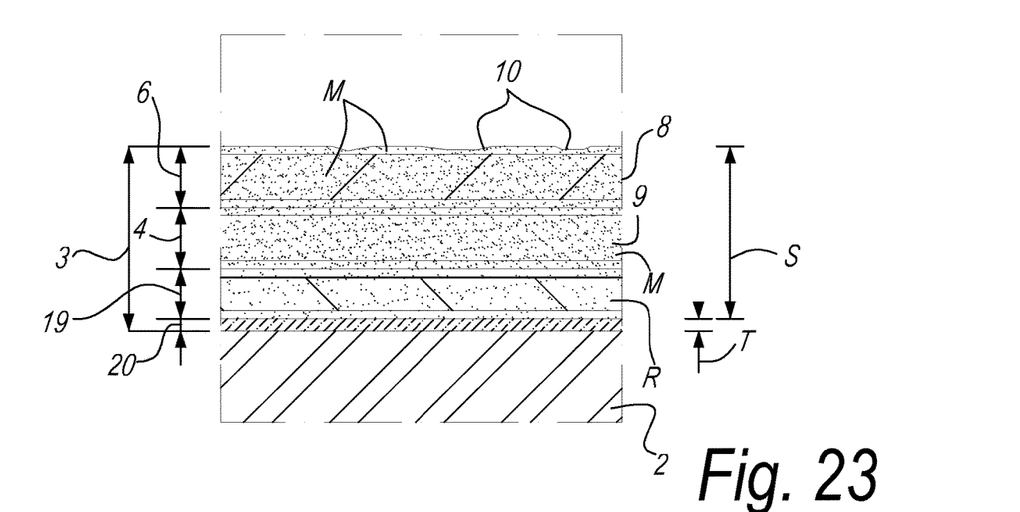
FIG. 23 on a larger scale shows a view on the area F22 indicated on FIG. 22.

FIGS. 22 and 23 shows a one embodiment of the panel 1 according to the fourth independent aspect of the invention. In practice, the panel 1 of FIGS. 22 and 23 differs from the embodiment shown in FIGS. 20 and 21 in that the top layer 4 is free from any binder B or binding layer 7.

Figure 13:
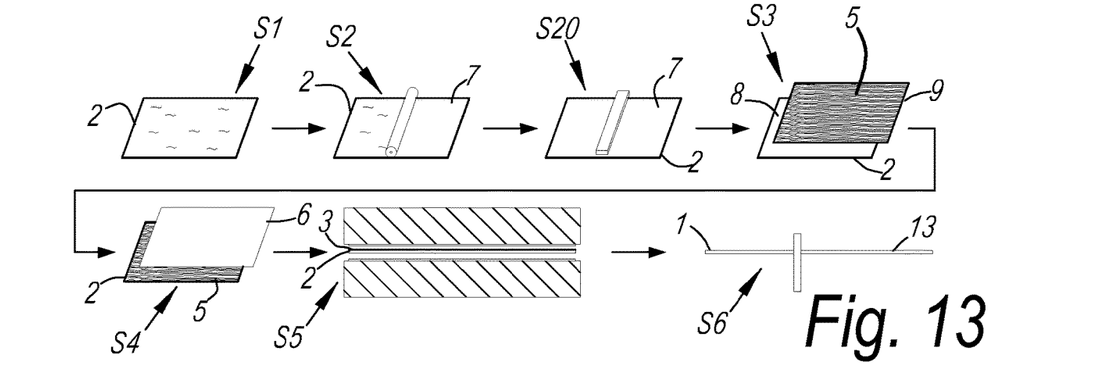
FIG. 13 schematically represents some steps in a method according to the invention.

FIG. 13 schematically represents some steps in a possible method for manufacturing floor panels 1. In particular the method illustrated in FIG. 13 is directed to manufacture the panels according to the embodiment shown in FIGS. 2 and 3.

The method comprises the step S1 of providing the substrate 2 for forming the floor panel 1.

The method further comprises the step S2 of providing the binder B above the substrate 2. In the embodiment of FIG. 8 the step S2 of providing the binder B is performed by coating the top surface of the substrate 2 with the binder B, for example by means of a roll coater or sprayer. In this way the binding layer 7 is provided on top of the substrate 2.

Subsequently said step S2 of providing the binder B the method comprises the step S20 of drying the binder B itself in order to remove most of, preferably all of, the water contained in the binder B. This is particularly the case when the binder B comprises a binder that is in water dispersion. Said step S20 of drying the binder B may be performed via hot air blowing, IR radiation, NIR radiation or a combination of one or more of these techniques.

The method further continues with the step S3 of providing a décor 3 on top of the substrate 2. In this embodiment, the step of providing the décor 3 comprise laminating a printed paper sheet 9 impregnated with melamine resin m. Preferably, the melamine impregnated printed paper sheet 9 is provided in a B-stage condition wherein the portion of the hardened resin is above 80% wt of the total mass of the resin in the printed paper sheet 9.

The method further comprises the step S4 of providing a overlay 6, possibly in the form of a paper sheet 8 impregnated with melamine resin M. In this case, the melamine impregnated paper sheet 8 is preferably provided in a B-stage condition wherein the portion of the hardened resin is above 60% wt of the total mass of the resin in the paper sheet 8. This step S4 is performed by laminating the paper sheet 8 on the substrate 2. Alternatively, this step may be performed by coating the decoration 3 with the melamine resin M in liquid form for example by spraying or rolling, or, preferably, in dry form by spreading a dry melamine resin on the substrate 2.

The method continues with a curing step S5 of hot pressing the melamine resin M directly onto the substrate 2. Preferably, this step is performed at a pressure comprised between 20 and 80 kg/cm$^2$, preferably between 35 and 60 kg/cm2.

In particular, according to a preferred embodiment of the invention the hot pressing step S5 is performed with a temperature above 175° C. and for a pressing time below 35 seconds. This S5 is performed with a temperature below 195° C. and for a pressing time above 12 seconds. This provides for a lower steam pressure between the melamine resin M and the substrate 2 to reduce the risk of delamination.

Preferably, during the curing step S5, the relief structure 10 can be embossed on the top layer of the panel.

The method further continues with the step S6 of providing the panel 1 with the coupling means 15, for example by milling the panel 1.

It is to be noted that according to an alternative but equivalent version of the embodiment shown in FIG. 13, the steps S2 and S20 may be performed on the bottom surface of the overlay 6 to be laminated on the substrate 2 during step S4 instead of the top surface of the substrate 2.

Figure 14:
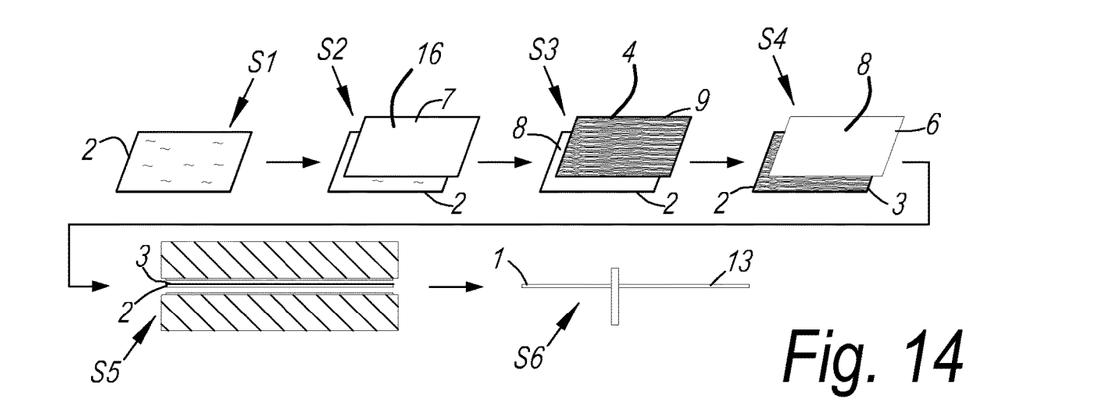
FIG. 14 schematically represents some steps in a method according to the invention.

FIG. 14 shows an alternative embodiment of the method that is directed to manufacture the panels 1 of the embodiment shown in FIGS. 4 and 5. The method of FIG. 14 differs from the method of FIG. 13 in that the step S2 of providing the binder B is performed by placing, for example laminating, a sheet of water absorbing substance, for example a paper sheet, a wood fiber sheet, a cellulose fiber sheet, or minerals, previously impregnated with the binder B.

Figure 15:
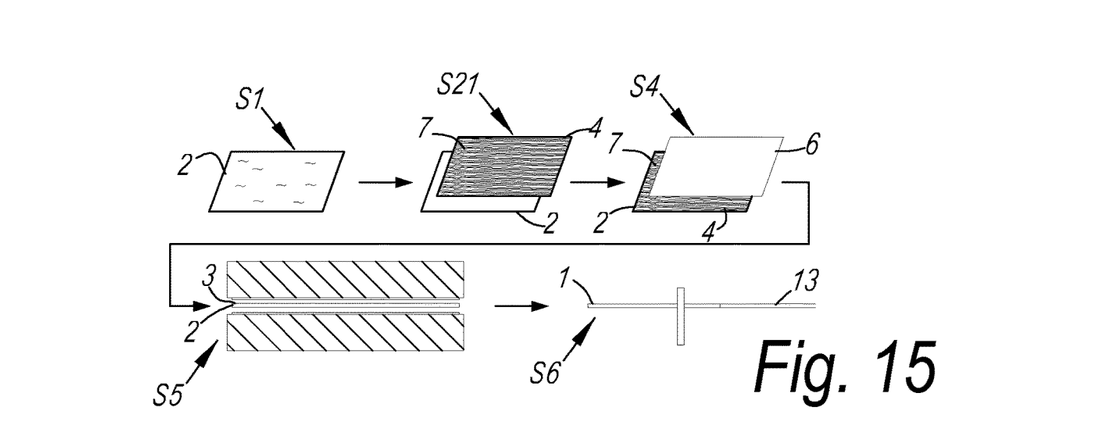
FIG. 15 schematically represents some steps in a method according to the invention.

FIG. 15 shows an alternative embodiment of the method that is directed to manufacture the floor panels 1 of the embodiment shown in FIGS. 6 and 7. The method of FIG. 15 differs from those of FIGS. 13 and 14 by the fact that it comprises a step S21 of providing a printed paper sheet 9 impregnated with the binder B. This step S21 substantially substitutes and group together the steps S2 and S3 of the embodiments of FIGS. 13 and 14.

Figure 16:
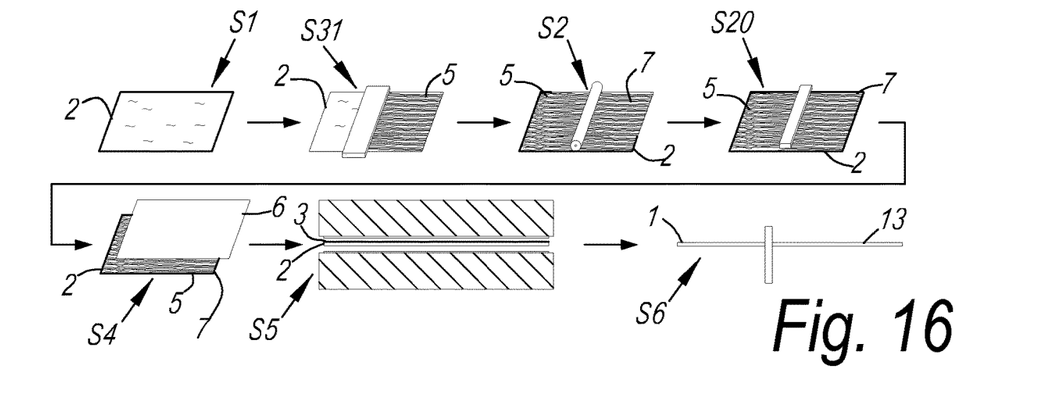
FIG. 16 schematically represents some steps in a method according to the invention.

FIG. 16 shows an alternative embodiment of the method that is directed to manufacture the floor panels 1 of the embodiment shown in FIGS. 8 and 9. The method of FIG. 16 differs from those previously described in that it comprises a step S31 of printing the décor 5 directly on the top surface of the substrate 2. Preferably, this step is performed via digital inkjet printing. The method of FIG. 16 further continues with step S2 of providing the binder B above the décor 5. Moreover, in the embodiment of FIG. 16 the step S2 of providing the binder B is performed by coating the top surface of the substrate 2 with the binder B, for example by means of a roll coater or sprayer, and is followed by the drying step S20. Therefore, in the present embodiment, the steps S2 and S20 are similar to those of FIG. 9.

It is to be noted that according to an alternative but equivalent version of the embodiment shown in FIG. 11, the steps S2 and S20 may be performed on the bottom surface of the overlay 6 to be laminated on the substrate 2 during step S4 instead of the top surface of the substrate 2.

With regard to the embodiment shown in FIG. 16, it is not excluded that prior to said step 31 of providing the décor 5 the method comprises on or more steps of treating the top surface of the substrate 2 in order to prepare it for direct printing, for example a step of providing a primer on the top surface of the substrate 2.

Figure 17:
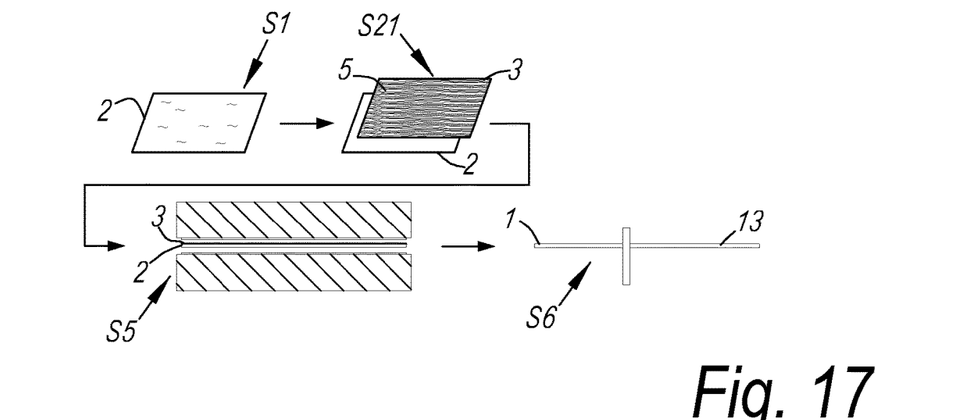
FIG. 17 schematically represents some steps in a method according to the invention.

FIG. 17 shows an embodiment of the method that is directed to manufacture the panels 1 of the embodiment shown in FIGS. 10 and 11. The method of FIG. 17 differs from the method of FIG. 13 in that it comprises the step S21 of providing a printed paper sheet 9 impregnated with a mixture of the melamine resin M and the binder B. This step S21 substantially substitutes and group together the steps S2 and S3 and S4 of the embodiments of FIGS. 13 and 14.

It is to be noted that the method in any of its embodiments may be directed to manufacturing a board having dimensions larger than those of the floor panel 1, and that after the step S5 of curing the melamine resin, the method comprises the step of cutting said board to obtain a plurality of panels 1. Said step of cutting may be performed before said step S6 providing the panel 1 with the coupling means 15.

The present invention is in no way limited to the herein above-described embodiments, on the contrary may such panels and methods be realized in various manners, without leaving the scope of the present invention.

The invention claimed is:

1. A method for manufacturing a panel comprising the following steps of:
   providing a substrate;
   providing a top layer comprising a binder and a melamine-based resin, wherein the top layer is provided on top of the substrate; and
   curing the melamine-based resin directly on top of the substrates;
   wherein the top layer comprises a binding layer comprising the binder and wherein the top layer comprises at least a melamine-based layer; and
   wherein the binding layer is interposed between the substrate and the melamine-based layer.

2. The method of claim 1, wherein the binder is selected from a group consisting of: polyacrylates based binder, polyvinyl acetate-based binder, polyester based, acrylic copolymers based binder or urethane based binder.

3. The method according to claim 2, wherein the binder is urethane based.

4. The method according to claim 3, wherein the urethane-based binder comprises a urethane based acrylic copolymers dispersion in water.

5. The method according to claim 1, wherein the binding layer comprises a décor.

6. The method according to claim 1, wherein the binding layer comprises a printed carrier having a décor and being impregnated with the binder.

7. The method according to claim 1, wherein the top layer comprises a layer having a mixture of the melamine-based resin and of the binder.

8. The method according to claim 1, wherein the top layer comprises a water absorbing substance.

9. The method according to claim 8, wherein the water absorbing substance is selected from a group consisting of: wood fibers, cellulose fibers, paper or mineral particles.

10. The method according to claim 1, wherein the substrate is substantially made of a synthetic material.

11. The method according to claim 1, wherein the method comprises a step of providing the binder on top of the substrate that comprises providing a carrier impregnated with the binder.

12. The method according to claim 1, wherein the curing step is a hot pressing step.

13. The method of claim 12, wherein the hot pressing step is performed at a temperature comprised between 140° C. and 220° C.

14. The method of claim 12, wherein the step of hot pressing is performed for a pressing comprised between 10 and 60 seconds.

15. A method for manufacturing a panel comprising the following steps:
- providing a substrate;
- providing a top layer comprising a binder and a melamine-based resin, wherein the top layer is provided on top of the substrate; and
- curing the melamine-based resin directly on top of the substrate;
- wherein the top layer comprises a binding layer comprising the binder and wherein the top layer comprises at least a melamine-based layer;
- wherein the binding layer is interposed between the substrate and the melamine-based layer;
- wherein the binder is urethane based;
- wherein the substrate is substantially made of a synthetic material.

\* \* \* \* \*